(12) United States Patent
Chang et al.

(10) Patent No.: US 8,194,594 B2
(45) Date of Patent: Jun. 5, 2012

(54) METHOD FOR TRANSMITTING SIGNAL AND INFORMATION ON ANTENNA, AND METHOD FOR ESTIMATING THE NUMBER OF ANTENNAS

(75) Inventors: Kap-Seok Chang, Daejeon (KR); Hyeong-Geun Park, Daejeon (KR); Il-Gyu Kim, Seoul (KR); Young-Jo Ko, Daejeon (KR); Hyo-Seok Yi, Daejeon (KR); Young-Hoon Kim, Daejeon (KR); Seung-Chan Bang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 535 days.

(21) Appl. No.: 12/517,767

(22) PCT Filed: Dec. 5, 2007

(86) PCT No.: PCT/KR2007/006290
§ 371 (c)(1),
(2), (4) Date: Jun. 4, 2009

(87) PCT Pub. No.: WO2008/069579
PCT Pub. Date: Jun. 12, 2008

(65) Prior Publication Data
US 2010/0046432 A1    Feb. 25, 2010

(30) Foreign Application Priority Data

Dec. 5, 2006  (KR) .................. 10-2006-0121968
Jun. 26, 2007 (KR) .................. 10-2007-0062683
Jun. 26, 2007 (KR) .................. 10-2007-0062757

(51) Int. Cl.
*H04W 4/00* (2009.01)
(52) U.S. Cl. ............................................. 370/328
(58) Field of Classification Search .............. 370/328; 455/103, 561, 562.1; 375/260
See application file for complete search history.

(56) References Cited

U.S. PATENT DOCUMENTS
2005/0058212 A1* 3/2005 Shao ........................ 375/260

FOREIGN PATENT DOCUMENTS

| EP | 1608081 A2 | 12/2005 |
|---|---|---|
| WO | WO-2006/020741 A2 | 2/2006 |
| WO | WO-2006/049443 A1 | 5/2006 |

* cited by examiner

*Primary Examiner* — Derrick Ferris
*Assistant Examiner* — Mang Yeung
(74) *Attorney, Agent, or Firm* — Nelson Mullins Riley & Scarborough LLP; EuiHoon Lee

(57) ABSTRACT

A base station applies frequency switching transmission diversity and a precoding vector to a synchronization channel and applies a space-frequency block coding and a precoding vector to a broadcast channel. The base station controls the synchronization channel and the broadcast channel to be positioned adjacent each other and then generates and transmits a downlink frame. The base station includes partial information on the number of antennas in the synchronization channel, and other information thereon in the broadcast channel.

10 Claims, 7 Drawing Sheets

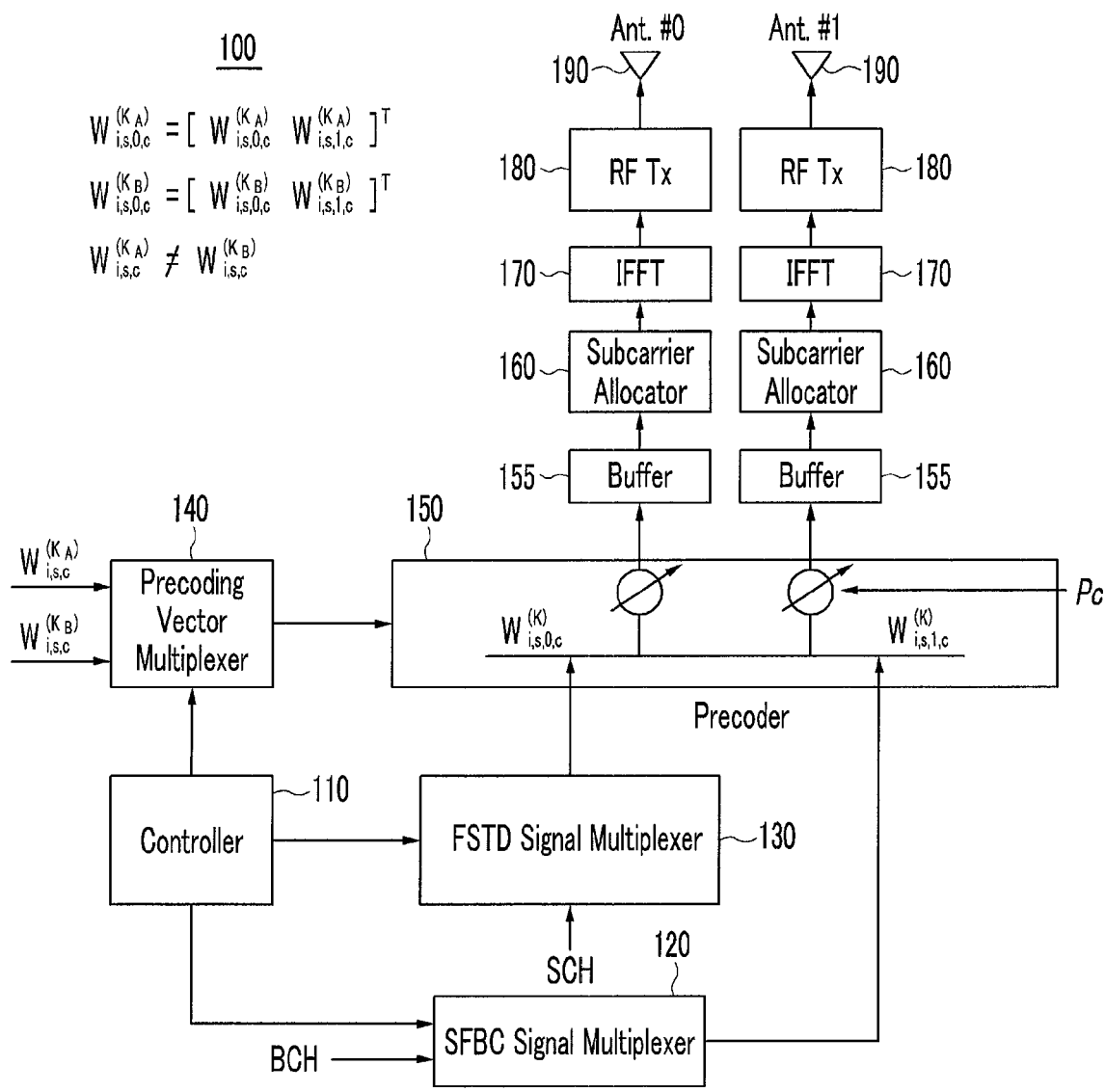
[FIG. 1]

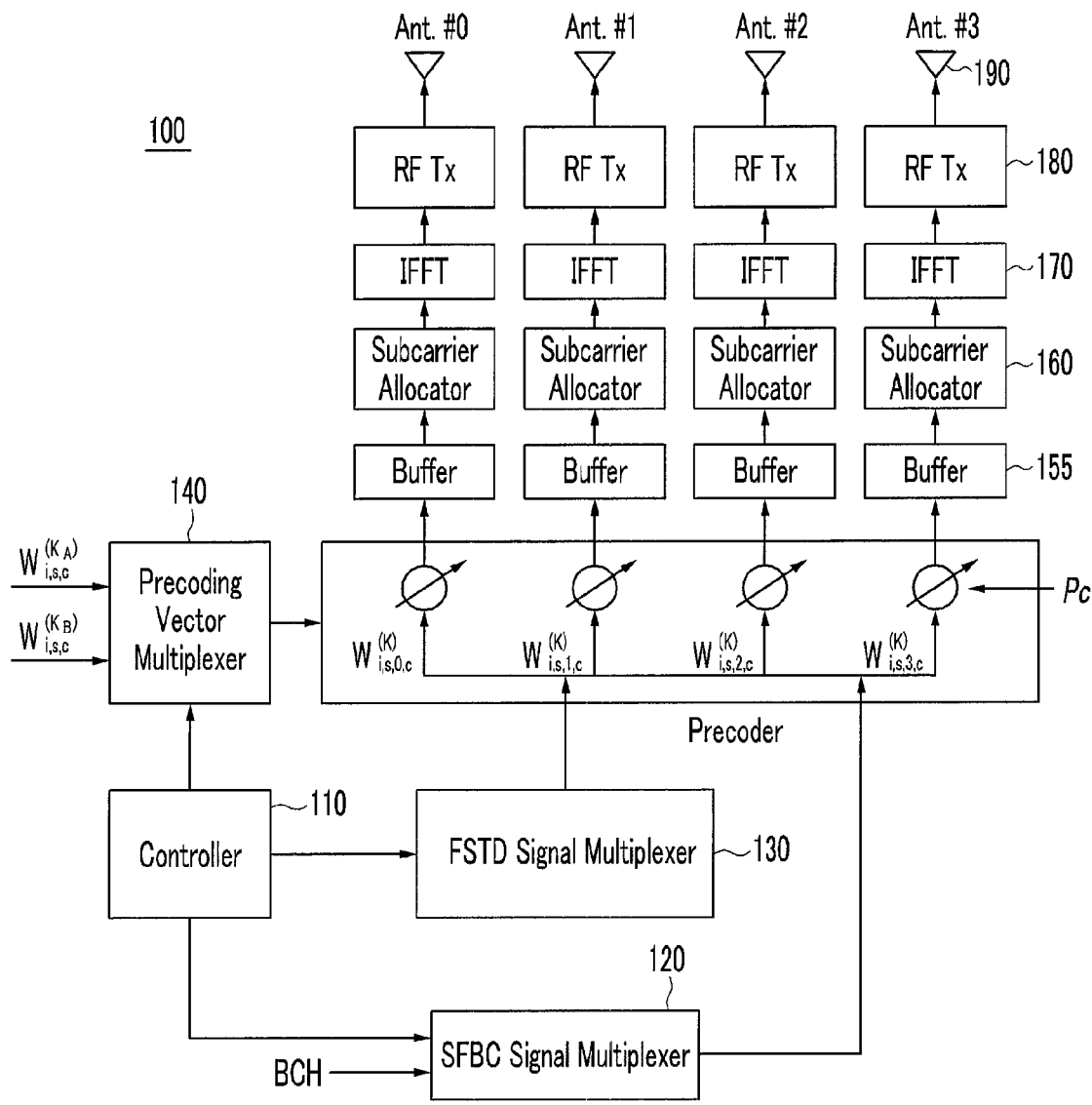

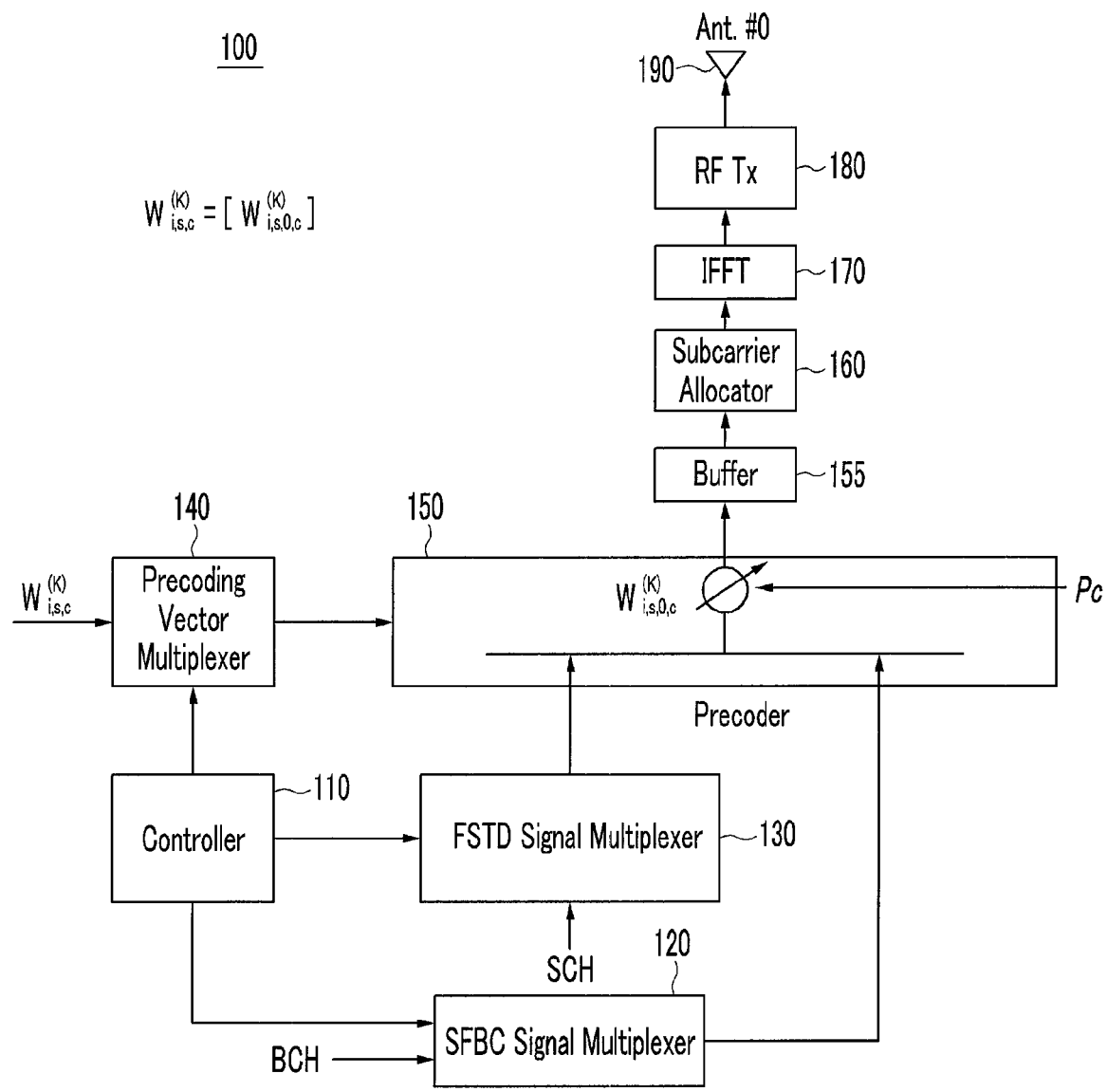

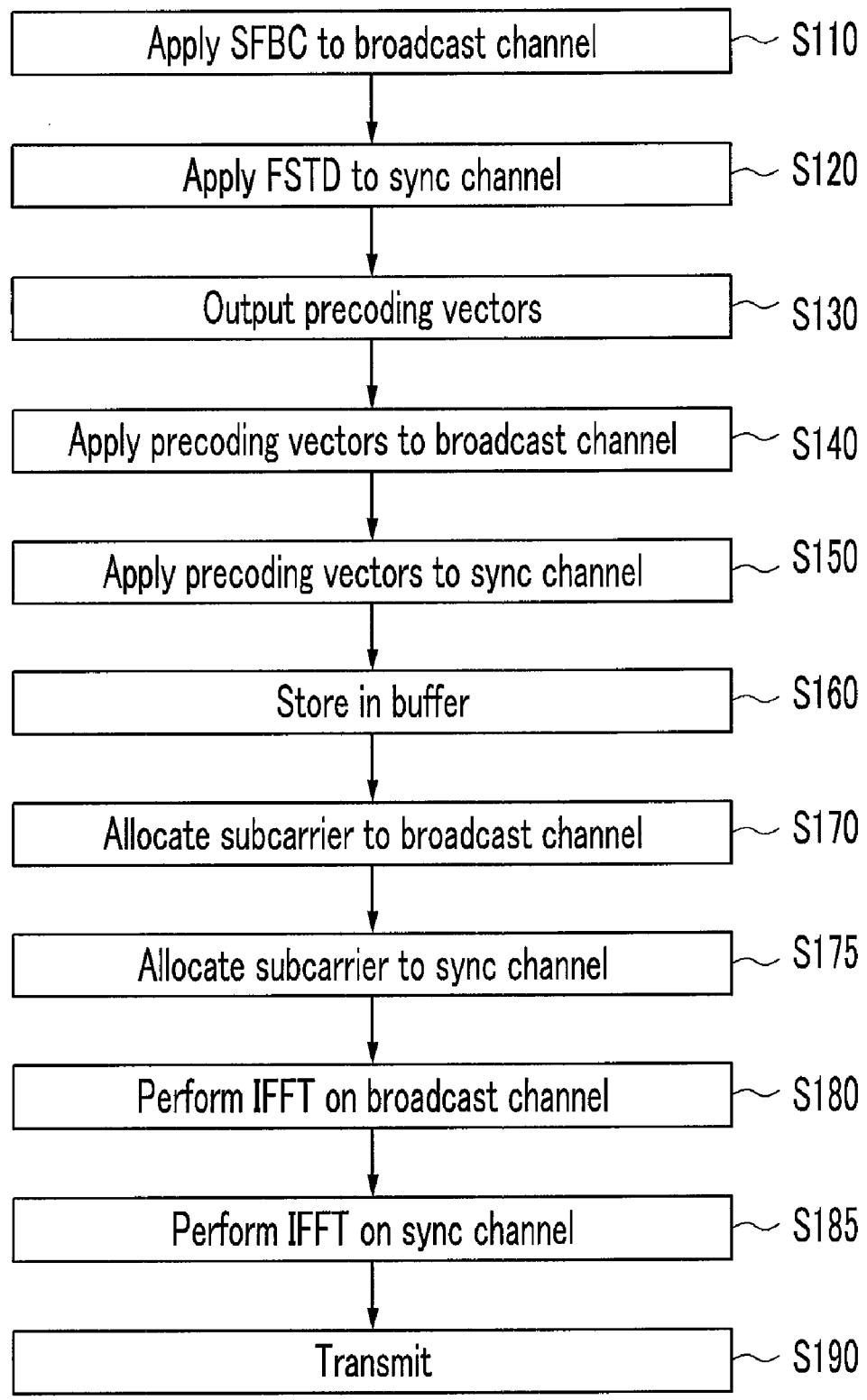
[FIG. 4]

[FIG. 5]
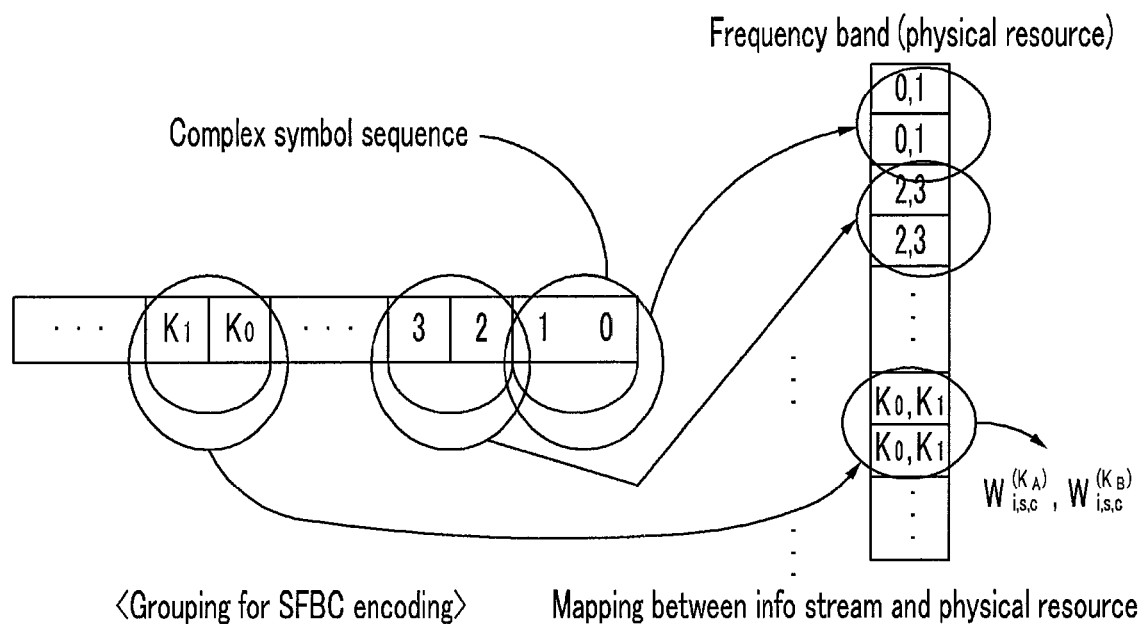

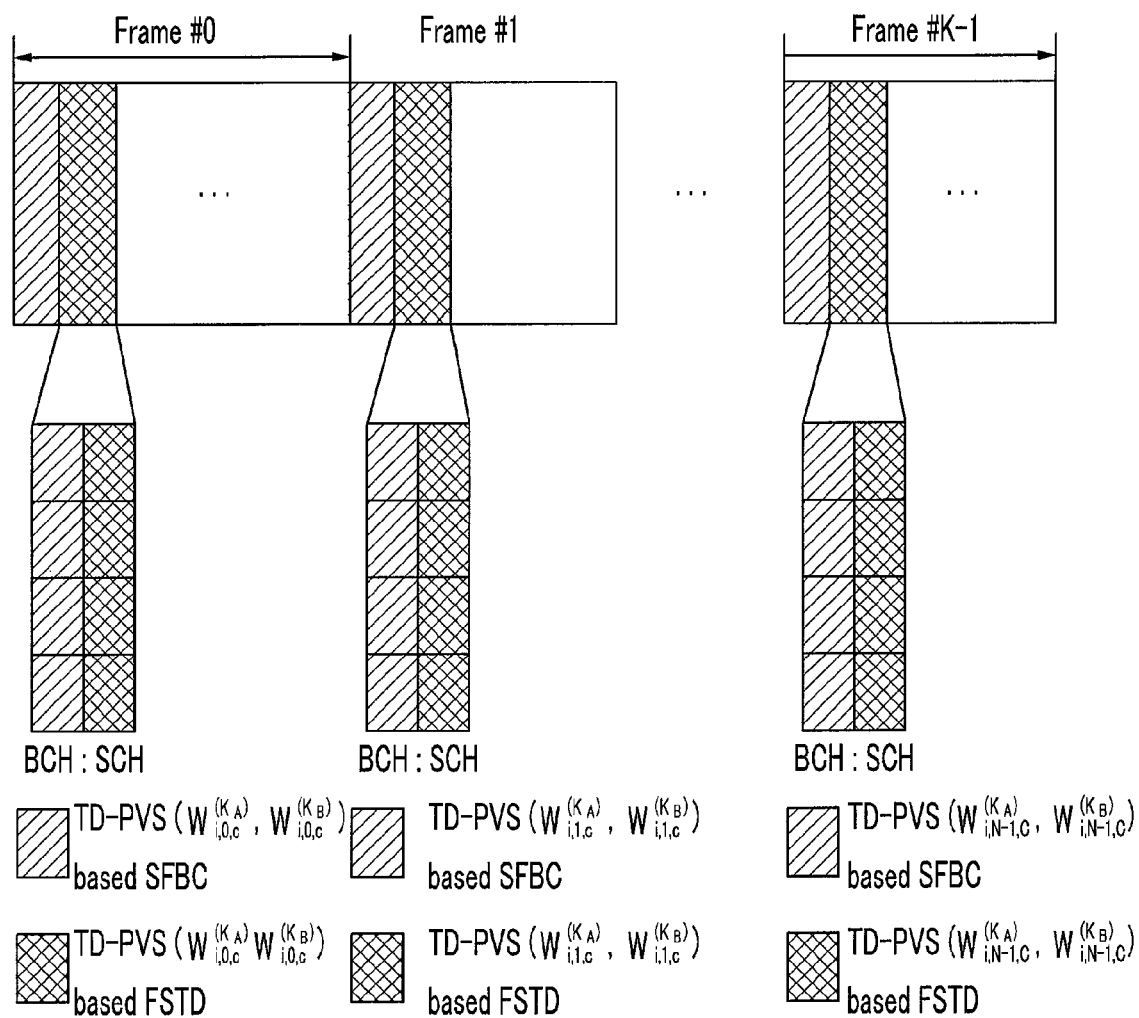

[FIG. 7]
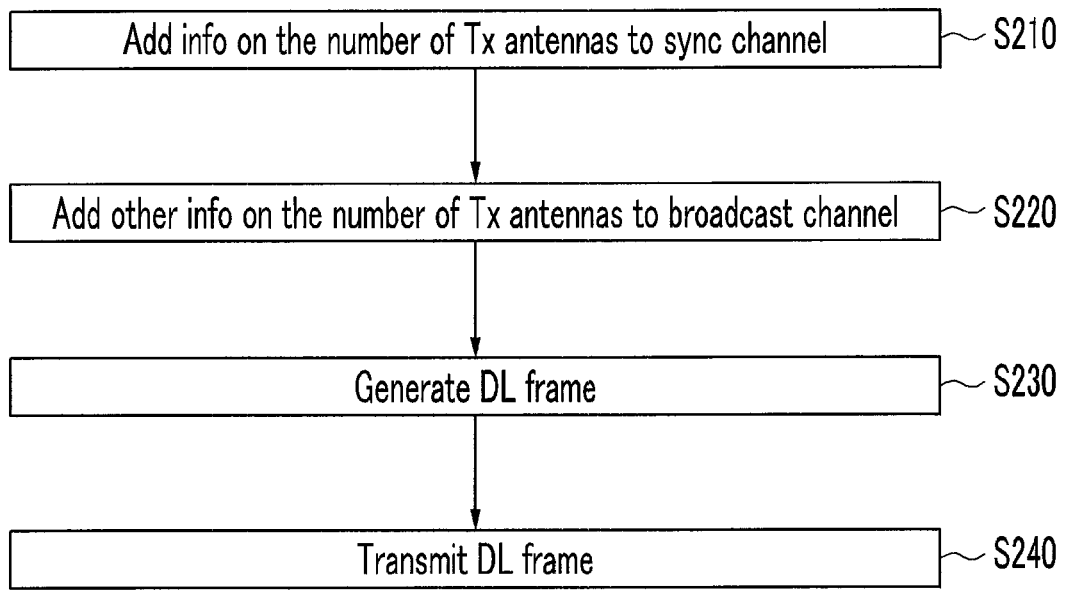
[FIG. 8]
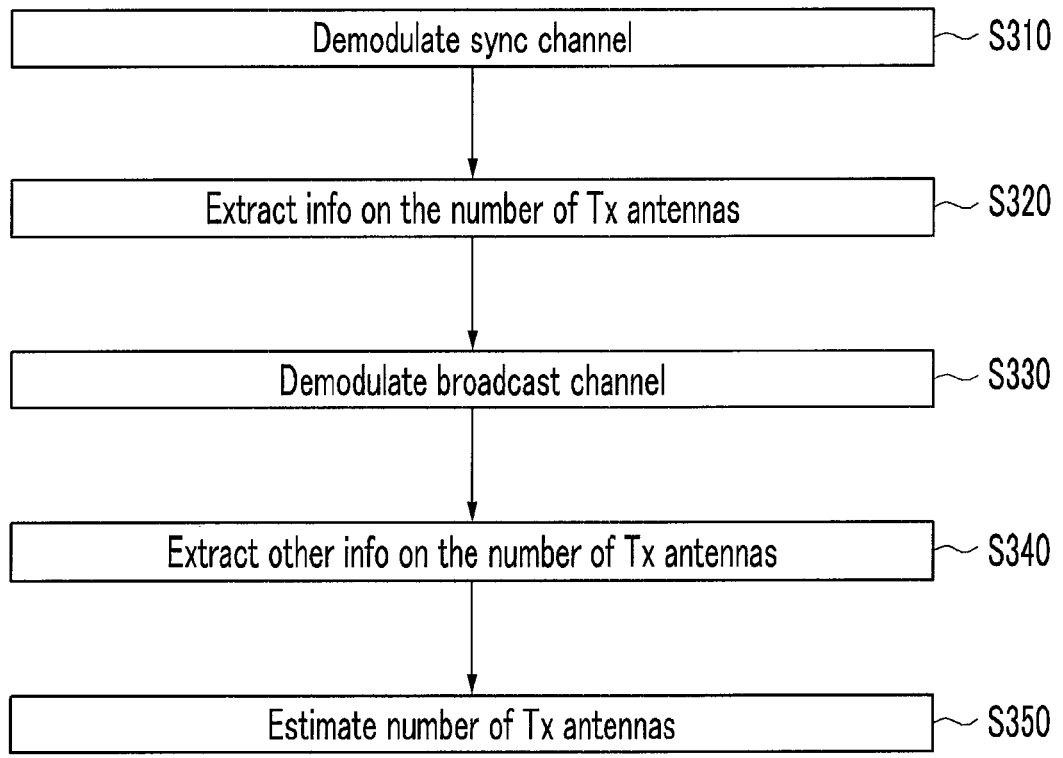

METHOD FOR TRANSMITTING SIGNAL AND INFORMATION ON ANTENNA, AND METHOD FOR ESTIMATING THE NUMBER OF ANTENNAS

RELATED APPLICATIONS

This application is a 35 U.S.C. §371 national stage filing of PCT Application No. PCT/KR2007/006290 filed on Dec. 5, 2007, which claims priority to, and the benefit of, Korean Patent Application No. 10-2006-0121968 filed on Dec. 5, 2006, Korean Patent Application No. 10-2007-0062683 filed on Jun. 26, 2007 and Korean Patent Application No. 10-2007-0062757 filed on Jun. 26, 2007. The contents of the aforementioned applications are hereby incorporated by reference.

TECHNICAL FIELD

The present invention relates to a signal and antenna information transmission method and an antenna number estimation method.

BACKGROUND ART

Every mobile station (MS) is required to support scalable OFDM-based system bandwidth (e.g., 1.25 MHz~20 MHz), and efficiently receive BCH (broadcast channel) information in the initial access setup. The MS also needs to successfully receive the BCH information with a good quality.

However, the complexity of the MS may be increased in order to increase the receiving quality of BCH information.

The above information disclosed in this Background section is only for enhancement of understanding of the background of the invention and therefore it may contain information that does not form the prior art that is already known in this country to a person of ordinary skill in the art.

DISCLOSURE

[Technical Problem]

The present invention has been made in an effort to provide a signal transmission method for improving BCH receiving quality while reducing complexity of a mobile station, an antenna information transmission method, and an antenna number estimation method.

[Technical Solution]

In one aspect of the present invention, a method for transmitting a signal includes: performing a space-frequency block coding process on a plurality of broadcast channel symbols for a plurality of space areas and a plurality of subcarriers to generate a plurality of coded symbols; applying a plurality of preceding vectors corresponding to the space areas to the coded symbols to generate a plurality of first symbol groups respectively corresponding to a plurality of antennas; and using the subcarriers to transmit the respective first symbol groups through the antennas.

The method further includes: applying frequency switching transmission diversity to a plurality of synchronization channel symbols; applying the precoding vectors to the synchronization channel symbols to generate a plurality of second symbol groups respectively corresponding to a plurality of antennas; and using the subcarriers to transmit the respective second symbol groups through the antennas.

The synchronization channel symbols include partial information on the number of the antennas, and the plurality of broadcast channel symbols include other information on the number of the antennas.

In another aspect of the present invention, a method for transmitting antenna information includes: using partial information on the number of antennas to generate at least one synchronization channel symbol; using other information on the number of antennas to generate at least one broadcast channel symbol; arranging at least one synchronization channel symbol in a first symbol interval of a downlink frame; arranging at least one broadcast channel symbol in a second symbol interval of the downlink frame; and transmitting the downlink frame.

The second symbol interval neighbors the first symbol interval.

In another aspect of the present invention, a method for estimating the number of transmit antennas includes: demodulating a synchronization channel; extracting first information on the number of antennas of a base station from the demodulated synchronization channel; using the first information and demodulating a broadcast channel neighboring the synchronization channel; extracting second information on the number of antennas of the base station from the demodulated broadcast channel; and using the first information and the second information to estimate the number of antennas of the base station.

[Advantageous Effects]

According to the embodiment of the present invention, a BS (base station) controls a BCH and an SCH (synchronization channel) to be located adjacently to each other in time domain and applies the same preceding vectors to the BCH and the SCH, and hence, the MS can easily demodulate the BCH by using the channel state information acquired through the SCH.

According to the embodiment of the present invention, the BS separately transmits the information on the number of transmit antennas through the BCH and the SCH so that the MS efficiently demodulates BCH information and the number of BCH information bits is reduced.

DESCRIPTION OF DRAWINGS

FIG. 1 is a block diagram of a base station according to a first exemplary embodiment of the present invention.

FIG. 2 is a block diagram of a base station according to a second exemplary embodiment of the present invention.

FIG. 3 is a block diagram of a base station according to a third exemplary embodiment of the present invention.

FIG. 4 is a flowchart for a base station to transmit signals according to an exemplary embodiment of the present invention.

FIG. 5 is a schematic view for allocating a subcarrier to broadcast channel symbols.

FIG. 6 is a plurality of frames transmitted by a base station according to an exemplary embodiment of the present invention.

FIG. 7 is a flowchart for a base station according to an exemplary embodiment of the present invention to transmit information on the number of transmit antennas.

FIG. 8 is a flowchart for a base station according to an exemplary embodiment of the present invention to receive information on the number of transmit antennas.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

Throughout the specification, a mobile station (MS) represents a terminal, a mobile terminal (MT), a subscriber station (SS), a portable subscriber station (PSS), user equipment (UE), and an access terminal (AT), and includes entire or partial functions of the terminal, mobile terminal, subscriber station, portable subscriber station, user equipment, and access terminal.

A base station (BS) represents an access point (AP), a radio access station (RAS), a nodeB (Node-B), an evolved Node-B (eNB), a base transceiver station (BTS), and a mobile multi-hop relay (MMR)-BS, and includes entire or partial functions of the AP, RAS, Node-B, eNB, BTS, and MMR-BS.

Referring to FIG. 1 to FIG. 3, a base station according to an exemplary embodiment of the present invention will now be described.

FIG. 1 is a block diagram of a base station according to a first exemplary embodiment of the present invention, FIG. 2 is a block diagram of a base station according to a second exemplary embodiment of the present invention, and FIG. 3 is a block diagram of a base station according to a third exemplary embodiment of the present invention.

As shown in FIG. 1 to FIG. 3, the base station 100 includes a controller 110, a space-frequency block coding (SFBC) signal multiplexer 120, a frequency switching transmission diversity (FSTD) signal multiplexer 130, a preceding vector multiplexer 140, a precoder 150, at least one transmitting antenna 190, at least one buffer 155 corresponding to the at least one transmit antenna 190, at least one subcarrier allocator 160 corresponding to the at least one transmit antenna 190, at least one inverse fast Fourier transformer (IFFT) 170 corresponding to the at least one transmit antenna 190, and at least one radio frequency (RF) transmitter 180 corresponding to the at least one transmit antenna 190.

Referring to FIG. 4, a method for the base station 100 according to the exemplary embodiment of the present invention to transmit signals will be described.

FIG. 4 is a flowchart for the base station according to the exemplary embodiment of the present invention to transmit signals.

The SFBC signal multiplexer 120 performs block coding on a plurality of broadcast channel (BCH) symbols for a plurality of space areas and a plurality of subcarriers according to control by the controller 110 to generate a coded symbol matrix corresponding to a plurality of coded symbols (S110). The coded symbol matrix $D_{k,i,c}(s)$ that is generated when the SFBC signal multiplexer 120 performs block coding on two broadcast channel symbols for two space areas and two frequency domain is expressed in Equation 1.

$$D_{k,i,c}(s) = \begin{bmatrix} D_{k_0,i,c}(s) & -D^*_{k_1,i,c}(s) \\ D_{k_1,i,c}(s) & D^*_{k_0,i,c}(s) \end{bmatrix} \quad \text{(Equation 1)}$$

In Equation 1, a plurality of rows represent a plurality of space areas, and a plurality of columns represent a plurality of subcarriers. $D_{k_0,i,c}(s)$ and $D_{k_1,i,c}(s)$ correspond to two broadcast channel symbols used by the SFBC signal multiplexer 120. k is an index of the broadcast channel symbol group used by the SFBC signal multiplexer 120, and $k_0$ and $k_1$ are indexes of two broadcast channel symbols included by the broadcast channel symbol group. i indicates an OFDM symbol index, s is a transmission time interval (TTI) index, and c represents a sector index.

The FSTD signal multiplexer 130 applies FSTD on a plurality of synchronization channel (SCH) symbols according to control by the controller 110 to generate an FSTD applied symbol matrix $A_{k,i,c}(s)$ (S120). The FSTD applied symbol matrix $A_{k,i,c}(s)$ that is generated when the FSTD signal multiplexer 130 applies FSTD on two synchronization channel symbols for two space areas and two subcarriers is expressed in Equation 2.

$$A_{k,i,c}(s) = \begin{bmatrix} A_{k_0,i,c}(s) & 0 \\ 0 & A_{k_1,i,c}(s) \end{bmatrix} \quad \text{(Equation 2)}$$

In Equation 2, a plurality of rows represent a plurality of space areas, and a plurality of columns represent a plurality of subcarriers. $A_{k_0,i,c}(s)$ and $A_{k_1,i,c}(s)$ correspond to two synchronization channel symbols used by the FSTD signal multiplexer 130. k is an index of the synchronization channel symbol group used by the FSTD signal multiplexer 130, and $k_0$ and $k_1$ are indexes of two synchronization channel symbols included by the synchronization channel symbol group.

The precoding vector multiplexer 140 outputs a plurality of precoding vectors that correspond to an OFDM symbol index (i), a transmission time interval index (s), and a sector index (c) to the precoder 150 according to control by the controller 110 (S130). In this instance, a plurality of precoding vectors are designed to be orthogonal with each other or have less correlation. The precoding vectors respectively include at least one preceding weight corresponding to at least one transmit antenna 190. Also, the preceding vectors respectively correspond to a plurality of space areas. That is, when there are two space areas, the precoding vector group $(w_{i,s,c}^{(k)})$ is expressed in Equation 3.

$$w_{i,s,c}^{(k)} = [w_{i,s,c}^{(k_A)} \ w_{i,s,c}^{(k_B)}] \quad \text{(Equation 3)}$$

In Equation 3, k is an index of a preceding vector group, and $k_A$ and $k_B$ are indexes of two preceding vectors included by the preceding vector group. $w_{i,s,c}^{(k_A)}$ is a precoding vector corresponding to the preceding vector index $(k_A)$, OFDM symbol index (i), transmission time interval index (s), and sector index (c).

When there are two transmit antennas 190, the preceding vector group expressed in Equation 4 can be used.

$$W_{i,s,c}^{(k)} = \begin{bmatrix} w_{i,s,c}^{(k_A)} & w_{i,s,c}^{(k_B)} \end{bmatrix} \quad \text{(Equation 4)}$$
$$= \begin{bmatrix} w_{i,s,0,c}^{(k_A)} & w_{i,s,0,c}^{(k_B)} \\ w_{i,s,1,c}^{(k_A)} & w_{i,s,1,c}^{(k_B)} \end{bmatrix}$$
$$= \begin{bmatrix} 1 & 1 \\ e^{j(\phi_1^{(k_A)}(i,s))} & e^{j(\phi_1^{(k_B)}(i,s))} \end{bmatrix}$$

When there are four transmit antennas 190, the preceding vector group expressed in Equation 5 can be used.

$$W_{i,s,c}^{(k)} = \begin{bmatrix} w_{i,s,c}^{(k_A)} & w_{i,s,c}^{(k_B)} \end{bmatrix} \quad \text{(Equation 5)}$$

$$= \begin{bmatrix} w_{i,s,0,c}^{(k_A)} & w_{i,s,0,c}^{(k_B)} \\ w_{i,s,1,c}^{(k_A)} & w_{i,s,1,c}^{(k_B)} \\ w_{i,s,2,c}^{(k_A)} & w_{i,s,2,c}^{(k_B)} \\ w_{i,s,3,c}^{(k_A)} & w_{i,s,3,c}^{(k_B)} \end{bmatrix}$$

$$= \begin{bmatrix} 1 & 1 \\ e^{j(\phi_1^{(k_A)}(i,s))} & e^{j(\phi_1^{(k_B)}(i,s))} \\ e^{j(\phi_2^{(k_A)}(i,s))} & e^{j(\phi_2^{(k_B)}(i,s))} \\ e^{j(\phi_3^{(k_A)}(i,s))} & e^{j(\phi_3^{(k_B)}(i,s))} \end{bmatrix} \text{ or }$$

$$\begin{bmatrix} 1 & 0 \\ e^{j(\phi_1^{(k_A)}(i,s))} & 0 \\ 0 & 1 \\ 0 & e^{j(\phi_1^{(k_B)}(i,s))} \end{bmatrix}$$

In Equation 4 and Equation 5, respective elements of the preceding vectors have a time diversity phase weight $\phi_a^{(k_A)}(i,s), \phi_a^{(k_B)}(i,s)$. The time diversity phase weight is variable by the index (i) of the OFDM symbol interval or the index (s) of the transmission time interval, and may or may not be variable by the index of the sector. Also, the precoding vector group may or may not be variable by the group index k.

The precoder 150 applies a plurality of precoding vectors output by the preceding vector multiplexer 140 to the coded symbol matrix output by the SFBC signal multiplexer 120 to generate an information signal matrix of a broadcast channel (S140). The information signal matrix is expressed in Equation 6.

$$T_{k,i,c}(s) = \begin{bmatrix} T_{k_0,i,0,c}(s) & T_{k_1,i,0,c}(s) \\ T_{k_0,i,1,c}(s) & T_{k_1,i,1,c}(s) \\ \vdots & \vdots \\ T_{k_0,i,N_t-1,c}(s) & T_{k_1,i,N_t-1,c}(s) \end{bmatrix} \quad \text{(Equation 6)}$$

In Equation 6, $T_{k_{m'},a_x,c}(s)$ is a signal that is transmitted from the m-th subcarrier of the k-th group through the transmit antenna a. $N_t$ represents the number of transmit antennas 190.

The information signal matrix of the broadcast channel generated by the precoder 150 is expressed in Equation 7.

$$T_{k,i,c}(s)|_{BCH} = p_c W_{i,s,c}^{(k)} D_{k,i,c}(s) = \quad \text{(Equation 7)}$$

$$p_c \begin{bmatrix} w_{i,s,c}^{(k_A)} & w_{i,s,c}^{(k_B)} \end{bmatrix} \begin{bmatrix} D_{k_0,i,c}(s) & -D_{k_1,i,c}^*(s) \\ D_{k_1,i,c}(s) & D_{k_0,i,c}^*(s) \end{bmatrix}$$

In Equation 7, $p_c$ is a coefficient for space diversity between the sectors.

When the signals of the broadcast channel are different for the respective sectors, the signals of the broadcast channel correspond to sector-specific information, and $p_c$ is established as Equation 8.

$$p_c = 1 \quad \text{(Equation 8)}$$

When the signals of the broadcast channel are different for respective base stations and are the same for a plurality of sectors of one base station, the signals of the broadcast channel correspond to NodeB-specific information, and $p_c$ is established as Equation 9.

$$p_0 = 1, \; p_1 = e^{j(2\pi/3)}, \; p_2 = e^{j(4\pi/3)} \quad \text{(Equation 9)}$$

By setting the $p_c$ as expressed in Equation 9, the imbalance of broadcast channel signal receiving performance that may occur at the boundary of the sector is solved.

The precoder 150 applies a plurality of precoding vectors output by the precoding vector multiplexer 140 to the FSTD applied symbol matrix output by the FSTD signal multiplexer 130 to generate an information signal matrix of the synchronization channel (S150). The information signal matrix of the synchronization channel generated by the precoder 150 is expressed in Equation 10.

$$T_{k,i,c}(s)|_{SCH} = \quad \text{(Equation 10)}$$

$$p_c W_{i,s,c}^{(k)} A_{k,i,c}(s) = p_c \begin{bmatrix} w_{i,s,c}^{(k_A)} & w_{i,s,c}^{(k_B)} \end{bmatrix} \begin{bmatrix} A_{k_0,i,c}(s) & 0 \\ 0 & A_{k_1,i,c}(s) \end{bmatrix}$$

The precoder 150 stores signals of the information signal matrix of the broadcast channel and the synchronization channel in a plurality of buffers 155 (S160).

The respective subcarrier allocators 160 bring the signals of the information signal matrix of the broadcast channel from the corresponding buffer 155 to allocate a subcarrier and transmit the same to the corresponding IFFT 170 (S170).

FIG. 5 is a schematic view for allocating a subcarrier to broadcast channel symbols.

Referring to FIG. 5, the base station 100 performs a space-frequency block coding process on the two broadcast channel symbols corresponding to the group k, and applies two precoding vectors to allocate two subcarriers corresponding to the group k.

FIG. 4 will now be described.

Respective subcarrier allocators 160 bring signals of an information signal matrix of the synchronization channel from the corresponding buffer 155 to allocate a subcarrier and transmit the same to the IFFT 170 (S175).

The respective IFFTs 170 receive the subcarrier allocated broadcast channel signal from the corresponding subcarrier allocator 160 and perform an IFFT on the signal to generate an OFDM symbol of the broadcast channel (S180).

Also, the IFFTs 170 receive the subcarrier allocated synchronization channel signal from the subcarrier allocator 160 and perform an IFFT thereon to generate an OFDM symbol of the synchronization channel (S185).

Respective RF transmitters 180 transmit the OFDM symbol of the broadcast channel and the OFDM symbol of the synchronization channel output by the IFFT 170 through the antenna 190 (S190). In this instance, the respective RF transmitters 180 transmit the OFDM symbol of the broadcast channel and the OFDM symbol of the synchronization channel having the same index of the transmission time interval at the neighboring symbol intervals.

FIG. 6 shows a plurality of frames transmitted by a base station according to an exemplary embodiment of the present invention.

As shown in FIG. 6, the broadcast channel symbols that have undergone the space-frequency block coding process and to which two precoding vectors are applied are disposed in the s-th broadcast channel symbol interval. Synchronization channel symbols to which the FSTD is applied and two preceding vectors are applied are disposed in the s-th synchronization channel symbol interval. In this instance, The precoding vectors that are applied to the s-th broadcast channel symbol interval and the s-th synchronization channel symbol interval are the same. The s-th broadcast channel symbol interval and the s-th synchronization channel symbol interval are neighboring each other so that the mobile station demodulates the broadcast channel by using a channel response acquired through the synchronization channel.

The BCH demodulation method is varied according to the case in which there is one transmit antenna and the case in which there are a plurality of transmit antennas. Therefore, the base station needs to transmit information on the number of transmit antennas to the mobile station.

Referring to FIG. 7, a method for a base station according to an exemplary embodiment of the present invention to transmit information on the number of transmit antennas will now be described.

FIG. 7 is a flowchart for the base station to transmit information on the number of transmit antennas.

The base station 100 uses a cell group identifier and a cell identifier to generate a plurality of synchronization channel symbols, and in this instance adds partial information on the number of transmit antennas to a plurality of synchronization channel symbols (S210).

Next, the base station 100 uses other information on the number of transmit antennas to generate a plurality of broadcast channel symbols (S220).

The base station 100 disposes a plurality of synchronization channel symbols and a plurality of broadcast channel symbols to the symbol interval to generate a downlink frame (S230).

The base station 100 transmits the downlink frame (S240).

In FIG. 7, the base station 100 can allocate 1 bit so as to transmit synchronization channel information and broadcast channel information on the number of transmit antennas.

The synchronization channel information indicates whether the number of transmit antennas is 1 or not. When the number of transmit antennas is not 1, the base station 100 notifies whether the number of transmit antennas is 2 or 4 through the broadcast channel information on the number of antennas. When the number of transmit antennas is 1, the base station 100 may not include information on the number of antennas in the broadcast channel. When the number of transmit antennas is 1, the base station 100 may include the information on the number of antennas in the broadcast channel so that the mobile station may check the number of antennas.

The synchronization channel information may indicate whether the number of transmit antennas is 4 or not.

When the number of transmit antennas is not 4, the base station 100 notifies whether the number of transmit antennas is 1 or 2 through the information of the broadcast channel on the number of antennas. When the number of transmit antennas is 4, the base station 100 may not include information on the number of antennas in the broadcast channel. When the number of transmit antennas is 4, the base station 100 may include information on the number of antennas in the broadcast channel so that the mobile station may check the number of antennas.

Referring to FIG. 8, a method for a mobile station according to an exemplary embodiment of the present invention to receive information on the number of transmit antennas will now be described.

FIG. 8 is a flowchart for the mobile station to receive information on the number of transmit antennas.

The mobile station demodulates a synchronization channel (S310).

The mobile station extracts partial information on the number of transmit antennas of the base station from the demodulated synchronization channel (S320).

The mobile station uses the partial information on the number of transmit antennas extracted from the synchronization channel to demodulate a synchronization channel and a neighboring broadcast channel (S330).

The mobile station extracts other information on the number of transmit antennas from the demodulated broadcast channel (S340).

The mobile station uses the partial information on the number of transmit antennas extracted from the synchronization channel and the other information on the number of transmit antennas extracted from the broadcast channel to estimate the number of transmit antennas (S350).

When synchronization channel information indicates whether the number of transmit antennas is 1, the mobile station can estimate the number of transmit antennas as shown in Table 1.

TABLE 1

| Sync channel info | Broadcast channel info | Number of Tx antennas |
| --- | --- | --- |
| 0 | 0 | 1 |
| 0 | 1 | 4 |
| 1 | 0 | 2 |
| 1 | 1 | 4 |

In Table 1, the bit value of 0 of the synchronization channel information indicates that the number of transmit antennas is 1, and the bit value of 1 of the synchronization channel information indicates that the number of transmit antennas is not 1. When the bit value of the synchronization channel information is 1, the bit value 0 of the broadcast channel information indicates that the number of transmit antenna is 2, and the bit value 1 of the broadcast channel information indicates that the number of transmit antennas is 4. When the bit value of the synchronization channel information is 0, the bit value 0 of the broadcast channel information is information for checking the number of transmit antennas and indicates that the number of transmit antenna is 1. However, when the bit value of the synchronization channel information is 0 and the mobile station receives a as the bit value of the broadcast channel information, the mobile station determines that the bit value of the synchronization channel information has an error and estimates the number of transmit antennas to be 4 because the broadcast channel information is reliable when there is no cycle redundancy check (CRC) error during broadcast channel demodulation.

When the synchronization channel information indicates whether the number of transmit antennas is 4, the mobile station can estimate the number of transmit antennas as shown in Table 2.

TABLE 2

| Sync channel info | Broadcast channel info | Number of Tx antennas |
| --- | --- | --- |
| 0 | 0 | 4 |
| 0 | 1 | 2 |
| 1 | 0 | 1 |
| 1 | 1 | 2 |

In Table 2, the bit value 0 of the synchronization channel information indicates that the number of transmit antennas is 4, and the bit value 1 of the synchronization channel information indicates that the number of transmit antennas is not 4. When the bit value of the synchronization channel information is 1, the bit value 0 of the broadcast channel information indicates that the number of transmit antennas is 1 and the bit value 1 of the broadcast channel information indicates that the number of transmit antennas is 2. When the bit value of the synchronization channel information is 0, the bit value 0 of the broadcast channel information is information for checking the number of transmit antennas and indicates that the number of transmit antennas is 4. However, when the bit value of the synchronization channel information is 0 and the mobile station receives 1 as the bit value of the broadcast channel information, the mobile station determines that the bit value of the synchronization channel information has an error and estimates that the number of transmit antennas is 2 because the broadcast channel information is reliable when there is no CRC error during broadcast channel demodulation.

According to another exemplary embodiment of the present invention, the mobile station can demodulate the broadcast channel by using a channel response that is estimated through a forward reference signal or a common pilot channel other than the synchronization channel. In this case, the mobile station uses the common pilot signal to estimate the fading channel information per antenna, and applies the known precoding vector to demodulate the broadcast channel.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for transmitting a signal, comprising:
performing a space-frequency block coding process on a plurality of broadcast channel symbols for a plurality of space areas and a plurality of subcarriers to generate a plurality of coded symbols;
applying a plurality of precoding vectors corresponding to the space areas to the coded symbols to generate a plurality of first symbol groups respectively corresponding to a plurality of antennas;
using the subcarriers to transmit the respective first symbol groups through the antennas;
applying frequency switching transmission diversity to a plurality of synchronization channel symbols;
applying the precoding vectors to the synchronization channel symbols to generate a plurality of second symbol groups respectively corresponding to a plurality of antennas;
using the subcarriers to transmit the respective second symbol groups through the antennas, wherein the synchronization channel symbols include partial information on a number of the antennas, and the plurality of broadcast channel symbols include other information on the number of the antennas; and
using the partial information and the other information to estimate the number of the antennas of a base station.

2. The method of claim 1, wherein the step of transmitting the second symbol groups includes transmitting the second symbol groups through a symbol interval in which the first symbol groups are arranged and a neighboring symbol interval.

3. The method of claim 2, wherein
the precoding vectors are variable by a transmission time interval.

4. The method of claim 3, wherein
the precoding vectors are orthogonal.

5. The method of claim 4, wherein
the precoding vectors are not variable by an index of a precoding vector group, and
the precoding vectors are not variable by a sector index.

6. The method of claim 5, wherein
the step of generating first symbol groups includes
applying a coefficient variable by the sector index to the coded symbols to generate the first symbol groups.

7. The method of claim 6, wherein
the step of generating the second symbol groups includes
applying the coefficient to the synchronization channel symbols to generate the second symbol groups.

8. A method for transmitting antenna information comprising:
using partial information on a number of antennas of a base station to generate at least one synchronization channel symbol;
using other information on the number of antennas of the base station to generate at least one broadcast channel symbol, wherein the partial information and the other information are used to estimate the number of antennas of the base station;
arranging the at least one synchronization channel symbol in a first symbol interval of a downlink frame;
arranging the at least one broadcast channel symbol in a second symbol interval of the downlink frame; and
transmitting the downlink frame, wherein the second symbol interval neighbors the first symbol interval.

9. The method of claim 8, wherein
the partial information indicates whether the number of the antennas is 1.

10. A method for estimating a number of antennas comprising:
demodulating a synchronization channel;
extracting first information on a number of antennas of a base station from the demodulated synchronization channel;
using the first information and demodulating a broadcast channel neighboring the synchronization channel;
extracting second information on the number of antennas of the base station from the demodulated broadcast channel; and
using the first information and the second information to estimate the number of antennas of the base station.

* * * * *